United States Patent
Berry-Jones

(10) Patent No.: US 12,014,619 B2
(45) Date of Patent: Jun. 18, 2024

(54) PRESSURE-SENSING STEERING WHEEL COVER DEVICE

(71) Applicant: Veronica Berry-Jones, Converse, TX (US)

(72) Inventor: Veronica Berry-Jones, Converse, TX (US)

( * ) Notice: Subject to any disclaimer, the term of this patent is extended or adjusted under 35 U.S.C. 154(b) by 24 days.

(21) Appl. No.: 17/944,120

(22) Filed: Sep. 13, 2022

(65) Prior Publication Data
US 2024/0087430 A1  Mar. 14, 2024

(51) Int. Cl.
*G08B 21/02* (2006.01)
*B60Q 9/00* (2006.01)
*B62D 1/04* (2006.01)
*B62D 1/06* (2006.01)
*G08B 3/10* (2006.01)

(52) U.S. Cl.
CPC ............... *G08B 3/10* (2013.01); *B60Q 9/00* (2013.01); *B62D 1/046* (2013.01); *B62D 1/06* (2013.01)

(58) Field of Classification Search
USPC ........ 340/539.11, 575, 576, 905, 573.1, 436, 340/438, 439
See application file for complete search history.

(56) References Cited

U.S. PATENT DOCUMENTS

| 5,585,785 | A | | 12/1996 | Gwin | |
|---|---|---|---|---|---|
| 5,625,333 | A | * | 4/1997 | Clark | B60Q 5/003 338/2 |
| D526,255 | S | | 8/2006 | Peng | |
| 7,368,918 | B2 | * | 5/2008 | Henson | H02H 1/0015 324/536 |
| 8,405,496 | B2 | * | 3/2013 | Bennett | B60Q 9/00 340/576 |
| 8,983,732 | B2 | * | 3/2015 | Lisseman | B60K 28/066 701/45 |
| 2009/0209829 | A1 | | 8/2009 | Yanagidaira | |
| 2010/0240962 | A1 | * | 9/2010 | Contant | A61B 5/7405 600/300 |
| 2013/0173085 | A1 | | 7/2013 | Ganesch | |
| 2014/0157992 | A1 | * | 6/2014 | Farotto | G01N 9/14 99/276 |
| 2015/0274062 | A1 | * | 10/2015 | Wen | G07C 5/008 340/425.5 |
| 2016/0175091 | A1 | * | 6/2016 | Van Heugten | A61F 2/1624 623/6.22 |
| 2017/0166235 | A1 | * | 6/2017 | Walker | H04W 4/80 |
| 2021/0178839 | A1 | * | 6/2021 | Deniau | B60C 23/0479 |

FOREIGN PATENT DOCUMENTS

WO    WO2007111223    10/2007

* cited by examiner

*Primary Examiner* — Daniel Previl

(57) ABSTRACT

A pressure-sensing steering wheel cover device for emitting an alert signal when two hands are not grasping a steering wheel includes a steering wheel cover has a shape configured to be positioned on a steering wheel. A plurality of pressure sensors the pressure sensors is positioned such that pressure is detectable along a portion of the steering wheel cover. A control circuit is electrically coupled to the pressure sensors, wherein the control circuit is programmed to emit an alarm signal when a predetermined condition occurs. A transmitter is electrically coupled to the controller and is in communication with a mobile phone, wherein the transmitter sends an alert to the mobile phone when the control circuit emits the alarm signal. A power supply is electrically coupled to the control circuit.

7 Claims, 5 Drawing Sheets

PRESSURE-SENSING STEERING WHEEL COVER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to driving safety devices and more particularly pertains to a new driving safety device for emitting an alert signal when two hands are not grasping a steering wheel.

(2) Description of Related Art Including Information Disclosed Under 37 CFR 1.97 and 1.98

The prior art relates to driving safety devices which determine whether a steering wheel is being grasped and emit an alert when the steering wheel is not being grasp. However, the prior art does not disclose a device which transmits an alert signal to a mobile device when pressure is not detected near the steering wheel.

BRIEF SUMMARY OF THE INVENTION

An embodiment of the disclosure meets the needs presented above by generally comprising a steering wheel cover has a shape configured to be positioned on a steering wheel. A plurality of pressure sensors the pressure sensors is positioned such that pressure is detectable along a portion of the steering wheel cover. A control circuit is electrically coupled to the pressure sensors, wherein the control circuit is programmed to emit an alarm signal when a predetermined condition occurs. A transmitter is electrically coupled to the controller and is in communication with a mobile phone, wherein the transmitter sends an alert to the mobile phone when the control circuit emits the alarm signal. A power supply is electrically coupled to the control circuit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
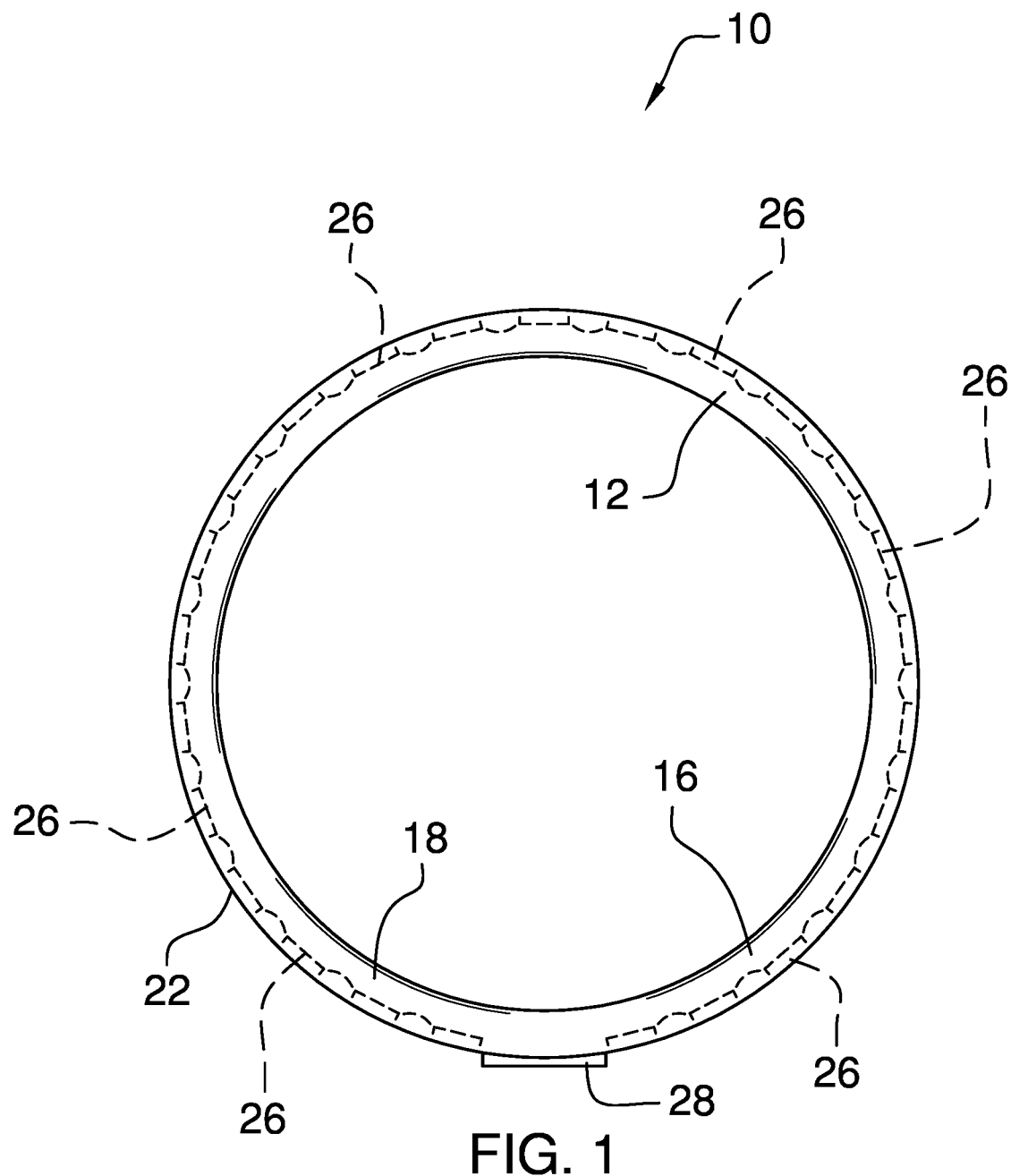
FIG. 1 is a front view of a pressure-sensing steering wheel cover device according to an embodiment of the disclosure.
Figure 2:
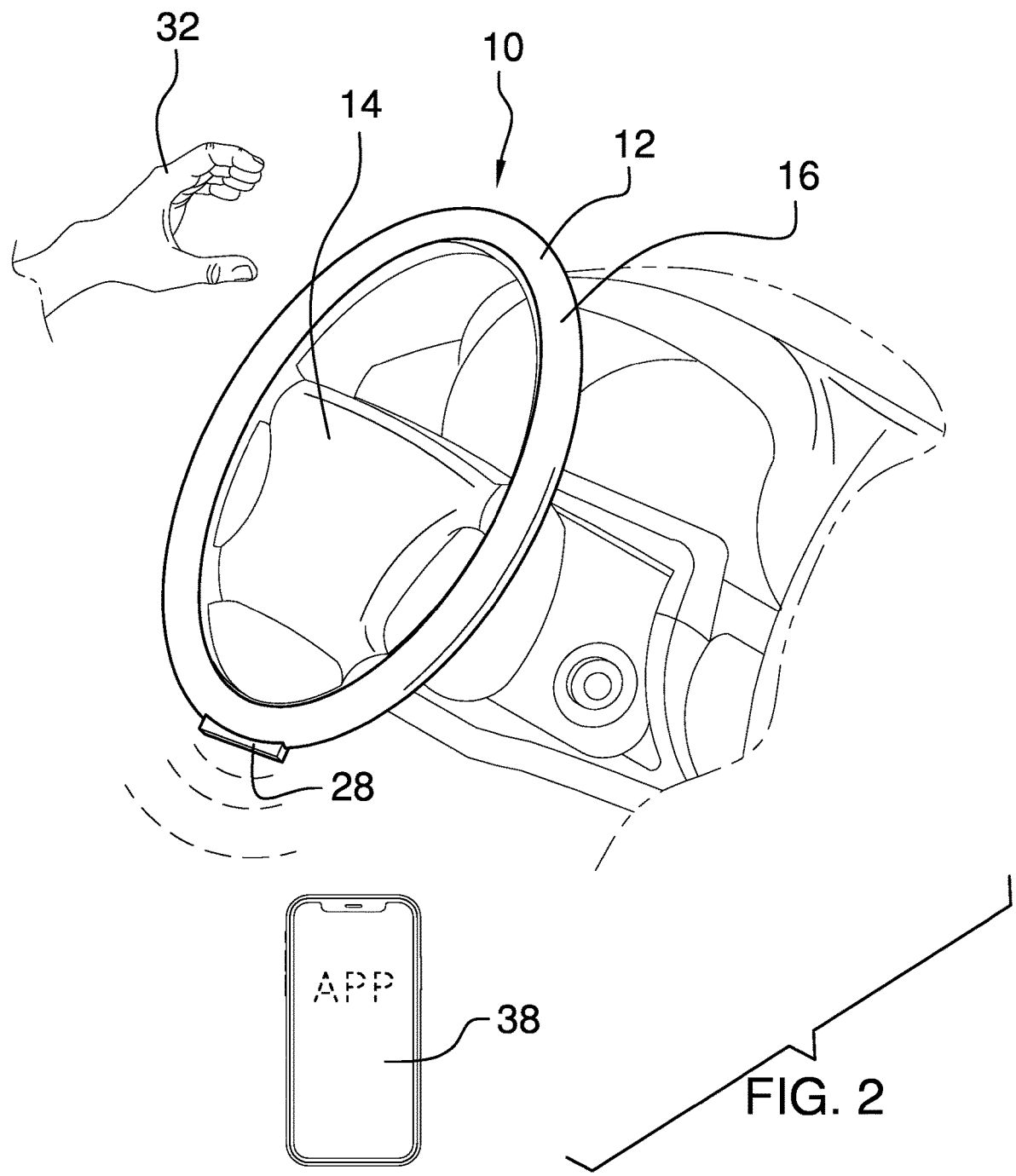
FIG. 2 is a perspective in-use view of an embodiment of the disclosure.
Figure 3:
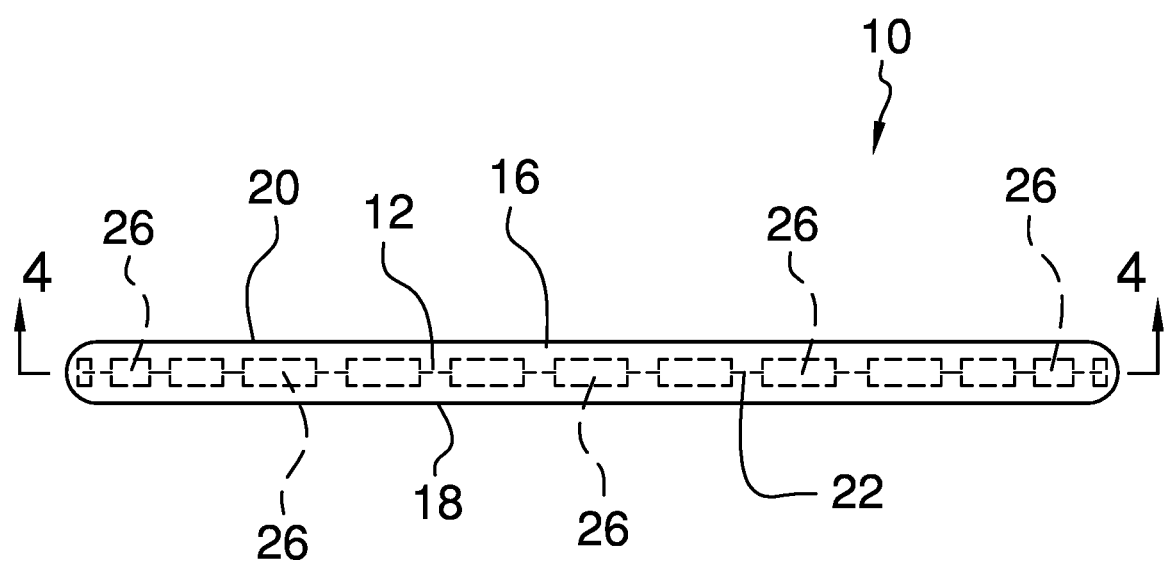
FIG. 3 is a top view of an embodiment of the disclosure.
Figure 4:
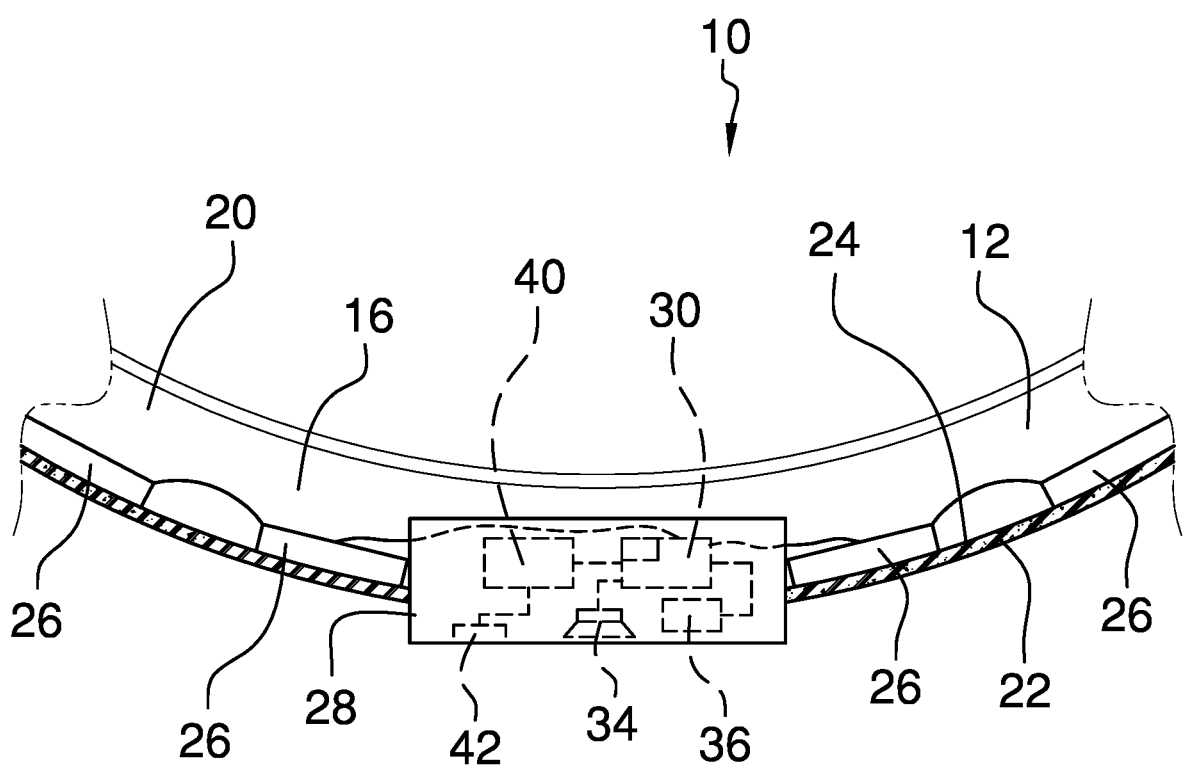
FIG. 4 is a cross-sectional detail view of an embodiment of the disclosure from the arrows 4-4 in FIG. 3.
Figure 5:
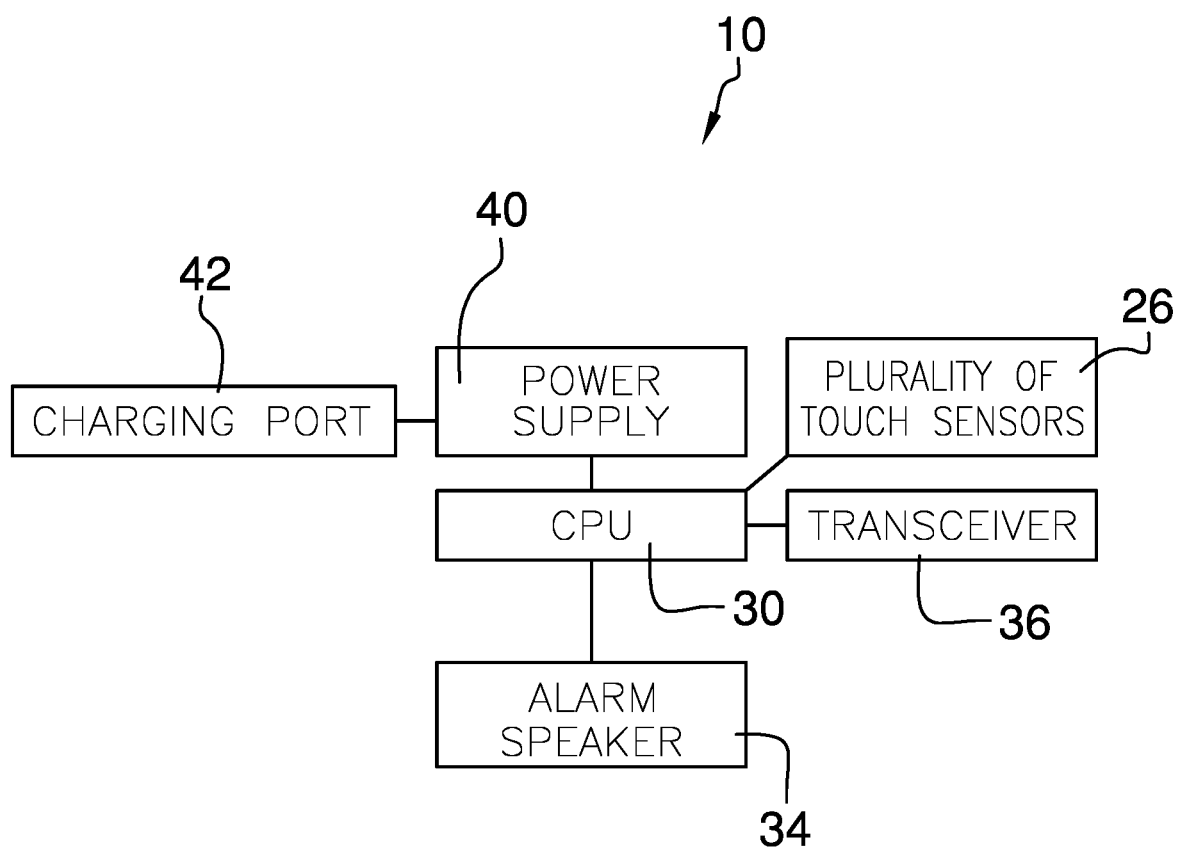
FIG. 5 is a block diagram of an embodiment of the disclosure.

With reference now to the drawings, and in particular to FIGS. 1 through 5 thereof, a new driving safety device embodying the principles and concepts of an embodiment of the disclosure and generally designated by the reference numeral 10 will be described.

As best illustrated in FIGS. 1 through 5, the pressure-sensing steering wheel cover device 10 generally comprises a steering wheel cover 12 has a shape configured to be positioned on a steering wheel 14. The steering wheel cover 12 has a peripheral wall 16 which includes a first side wall 18, a second side wall 20, and an intermediate wall 22 extending between the first side wall 18 and the second side wall 20. The peripheral wall 16 has an inner surface 24 that is concavely arcuate. A plurality of pressure sensors 26 is coupled to the steering wheel cover 12 and is positioned such that pressure is detectable along an entirety of the steering wheel cover 12. In this detailed description and in the claims, an "entirety of the steering wheel cover 12" means an exposed surface facing away from the steering wheel 14 when the steering wheel cover 12 is positioned on the steering wheel 14 and does not include portions of the steering wheel cover 12 which are obstructed by elements mounted on the steering wheel cover 12. Elements mounted on the steering wheel cover 12 may include, for example, later-claimed elements in this application.

A housing 28 is coupled to the steering wheel cover 12, and a control circuit 30 is positioned within the housing 28 and mounted on the steering wheel cover 12. The control circuit 30 is also electrically coupled to the pressure sensors 26 and is programmed to simultaneously detect pressure in two distinct positions relative to each other on the steering wheel cover 12, wherein distinct positions are defined as being at least 5.0 inches apart from each other. The control circuit 30 is programmed to emit an alarm signal when two distinct portions are not detected by the pressure sensors 26 for a predetermined amount of time. The predetermined amount of time may be factory-set or programmable by a service technician, user, or the like. Thus, when two hands 32 are placed on the steering wheel cover 12 such that pressure sensors 26 at least 5.0 inches apart detect pressure on the steering wheel cover 12, the alert signal will not be emitted. The predetermined amount of time provides a grace period during which an alert signal will not be emitted. This allows for one or more hands 32 to be temporarily removed from the steering wheel 14 to operate other functions within the vehicle being driven or during a turning of the wheel.

A speaker 34 is electrically coupled to the control circuit 30 and is positioned in the housing 28. The speaker 34 emits an audible alarm when the control circuit 30 emits the alarm signal. A transmitter 36 is also electrically coupled to the controller and is in communication with a mobile phone 38. The transmitter 36 sends an alert to the mobile phone 38 when the control circuit 30 emits the alarm signal. The transmitter may be configured for transmitting over one or more of a wireless personal area network and a wireless wide area network, including a cellular network. A power supply 40 is electrically coupled to the control circuit 30 which comprises a battery positioned in the housing 28. A charging port 42 is electrically coupled to the power supply 40 and is mounted on the housing 28.

In an alternative embodiment, the plurality of pressure sensors 26 may also be positioned such that pressure is detectable only along one or more portions of the steering wheel cover 12 less than the entirety of the steering wheel cover 12, and the control circuit 30 may be programmed to detect pressure in the one or more portions. This may include, for example, positioning sensors in an upper left portion and an upper right portion of the steering wheel 14 corresponding to the traditionally known "10 o'clock" and "2 o'clock" or "10 and 2" positions associated with safe hand positions during driving of a motor vehicle. If the pressure sensors 26 are placed in this way, the control circuit 30 may be programmed to emit the alert signal in the event that pressure is detected in fewer than two portions of the steering wheel 14.

In another alternative embodiment, the control circuit 30 may be programmed to emit the alert signal when a predetermined condition occurs. A "predetermined condition" in this detailed description and in the claims means a determination by the control circuit 30 that fewer than two distinct zones of the steering wheel cover 12 detect pressure within the predetermined amount of time. For example, the control circuit 30 could be programmed to determine that pressure sensed in the position of a group of adjacent pressure sensors 26 defines a pressure zone, wherein pressure sensed in another position of another group of adjacent pressure sensors 26 that are not adjacent to the previous group defines another distinct pressure zone. The control circuit 30 could be programmed this way under the reasoning that it is likely that a hand 32 grasping the steering wheel cover 12 causes the detection of a pressure zone, and another hand 32 grasping the steering wheel 14 at a distance from the previous hand 32 likely causes the detection of a pressure zone distinct from the previous pressure zone. Therefore, when fewer than two pressure zones are detected by the control circuit 30, it may be reasonably determined that two hands 32 are likely not grasping the steering wheel cover 12, and the alert signal will be emitted after the predetermined amount of time has elapsed.

In use, the steering wheel cover 12 is positioned on the steering wheel 14. Once activated, the control circuit 30 will automatically detect whether pressure is simultaneously detected in two distinct positions and will emit the alarm signal when two distinct portions are not detected by the pressure sensors 26 for the predetermined amount of time. This triggers the speaker 34 to emit the audible alarm and triggers the transmitter 36 to send the alert to the mobile phone 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pressure-sensing steering wheel cover device comprising:
   a steering wheel cover having a shape configured to be positioned on a steering wheel;
   a plurality of pressure sensors said pressure sensors being positioned such that pressure is detectable along a portion of said steering wheel cover;
   a control circuit being electrically coupled to said pressure sensors, said control circuit being programmed to emit an alarm signal when a predetermined condition occurs;
   a transmitter being electrically coupled to said controller and being in communication with a mobile phone, said transmitter sending an alert to said mobile phone when said control circuit emits said alarm signal; and
   a power supply being electrically coupled to said control circuit; and
   said pressure sensors being positioned such that pressure is detectable along an entirety of said steering wheel cover, said control circuit being programmed to simultaneously detect pressure in two distinct positions relative to each other on said steering wheel cover, wherein distinct positions are defined as being at least 5.0 inches apart from each other, said control circuit being programmed to emit an alarm signal when two distinct positions are not detected by said pressure sensors for a predetermined amount of time.

2. The device of claim 1, further comprising a speaker being electrically coupled to said control circuit, said speaker emitting an audible alarm when said control circuit emits said alarm signal.

3. The device of claim 1, further comprising a housing being coupled to said steering wheel cover, each of said control circuit, said transmitter, and said power supply being positioned within said housing.

4. The device of claim 1, further comprising said power supply comprising a battery.

5. The device of claim 1, further comprising a charging port being electrically coupled to said power supply.

6. The device of claim 1, further comprising said steering wheel cover having a peripheral wall, said peripheral wall including a first side wall, a second side wall, and an intermediate wall extending between said first side wall and said second side wall, said peripheral wall having an inner surface being concavely arcuate.

7. A pressure-sensing steering wheel cover device comprising:
- a steering wheel cover having a shape configured to be positioned on a steering wheel, said steering wheel cover having a peripheral wall, said peripheral wall including a first side wall, a second side wall, and an intermediate wall extending between said first side wall and said second side wall, said peripheral wall having an inner surface being concavely arcuate;
- a plurality of pressure sensors being coupled to said steering wheel cover, said pressure sensors being positioned such that pressure is detectable along an entirety of said steering wheel cover;
- a housing being coupled to said steering wheel cover;
- a control circuit being mounted on said steering wheel cover and being electrically coupled to said pressure sensors, said control circuit being positioned within said housing, said control circuit being programmed to simultaneously detect pressure in two distinct positions relative to each other on said steering wheel cover, wherein distinct positions are defined as being at least 5.0 inches apart from each other,
  said control circuit being programmed to emit an alarm signal when two distinct positions are not detected by said pressure sensors for a predetermined amount of time;
- a speaker being electrically coupled to said control circuit and being positioned in said housing, said speaker emitting an audible alarm when said control circuit emits said alarm signal;
- a transmitter being electrically coupled to said controller and being in communication with a mobile phone, said transmitter sending an alert to said mobile phone when said control circuit emits said alarm signal;
- a power supply being electrically coupled to said control circuit, said power supply comprising a battery positioned in said housing; and
- a charging port being electrically coupled to said power supply and being mounted on said housing.

* * * * *